United States Patent [19]

Fields et al.

[11] 4,182,847

[45] Jan. 8, 1980

[54] MONOMERS FOR POLY(METHYLENEBENZOATE) POLYMERS FROM TOLUIC ACID COMPOUNDS

[75] Inventors: Ellis K. Fields, River Forest; Steven A. Cerefice, Naperville; Edward E. Paschke, Glen Ellyn, all of Ill.

[73] Assignee: Standard Oil Company (Indiana), Chicago, Ill.

[21] Appl. No.: 915,826

[22] Filed: Jun. 16, 1978

Related U.S. Application Data

[62] Division of Ser. No. 779,706, Mar. 21, 1977, abandoned.

[51] Int. Cl.$^2$ .............................................. C08G 63/02
[52] U.S. Cl. .................................... 528/361; 204/59 F
[58] Field of Search ........................... 528/361; 204/59

[56] References Cited

U.S. PATENT DOCUMENTS

| | | | |
|---|---|---|---|
| 2,471,023 | 5/1949 | Cook et al. | 528/361 |
| 2,658,055 | 11/1953 | Alderson | 528/361 |
| 3,054,779 | 9/1962 | Wheeler | 528/361 |
| 3,252,877 | 5/1966 | Koehl | 204/59 |
| 3,448,021 | 6/1969 | Koehl | 204/72 |
| 4,024,032 | 5/1977 | Weinberg | 204/59 R |

*Primary Examiner*—Earl A. Nielsen
*Attorney, Agent, or Firm*—William C. Clarke; Arthur G. Gilkes; William T. McLain

[57] ABSTRACT

Highly-purified monomers for poly(p-methylenebenzoate) polymers and poly(m-methylenebenzoate) polymers are prepared by purifying acetoxylated hydroxymethylbenzoic acid compounds derived by side-chain acetoxylation of toluic acid compounds. The purification process can be by recrystallation or by fractional distillation.

11 Claims, No Drawings

MONOMERS FOR POLY(METHYLENEBENZOATE) POLYMERS FROM TOLUIC ACID COMPOUNDS

This is a division of application Ser. No. 779,706, filed Mar. 21, 1977, now abandoned.

BACKGROUND OF THE INVENTION

This invention relates to a process for preparing highly purified monomers of hydroxymethylbenzoic acid from toluic acid methyl ester compounds of a purity suitable for preparing linear polyester polymers.

Methyl hydroxymethylbenzoates have been suggested as monomers for poly(p-methylenebenzoate) polymers and poly(m-methylenebenzoate) polymers but must be of a purity better than 99.5% to be considered as monomer grade. Ordinary methods of purification of methyl hydroxymethylbenzoates such as crystallization and distillation are not suitable economically. If methyl p-hydroxymethylbenzoate is crystallized and recrystallized to obtain a pure monomer, the crystallization is performed with great difficulty and uneconomic yield losses occur because of difficulty in crystallizing and similar solubilities in the crystallizing media of unwanted impurities such as carboxybenzaldehydes. Distillation of methyl hydroxymethylbenzoate, either para or meta isomer, results in a less pure product than the starting material because of the formation of carboxybenzaldehydes among other by-products of the distillation.

p-Hydroxymethylbenzoic acid is believed to have been first prepared as early as 1872 by free-radical bromination of p-toluic acid to p-bromomethylbenzoic acid, hydrolysis with aqueous barium hydroxide and subsequent purification by recrystallization from water. Other methods for the preparation of p-hydroxymethylbenzoic acid and/or methyl p-hydroxymethylbenzoate have since been discovered, including:

(a) Hydrolysis of p-toluic acid and derivatives functionalized at the benzylic position, such as p-halomethylbenzoic acid and esters.

(b) Hydrolysis of p-halomethylbenzonitriles, p-hydroxymethylbenzonitrile and p-chloro-toluyl chloride.

(c) Oxidation of p-xylene and substituted p-xylenes, such as p-hydroxymethyltoluene, p-acetoxymethyltoluene and p-xylenediol, and oxidation of p-toluic acid, p-tolualdehyde, and derivatives.

(d) Chloromethylation of benzoic acid and toluene derivatives.

(e) Carboxylation of p-halolotoluene compounds via lithium salts.

(f) Disproportionation of terephthaldehyde (Cannizzaro reaction).

(g) Polarographic reduction of dimethyl terephthalate.

A successful synthesis of polymer-grade p-hydroxymethylbenzoic acid requires that the synthesis be highly selective, as p-hydroxymethylbenzoic acid is extremely difficult to purify especially from 4-carboxybenzaldehyde and terephthalic acid. High purity (99.7+%) p-hydroxymethylbenzoic acid has been obtained by recrystallization of crude products which did not originally contain any 4-carboxybenzaldehyde. However purification of p-hydroxymethylbenzoic acid containing p-toluic acid, terephthalic acid and 4-carboxybenzaldehyde has not been successful as no economically satisfactory method has been found for removal of 4-carboxybenzaldehyde. Consequently, a successful selective synthesis of p-hydroxymethylbenzoic acid must give a product free of 4-carboxybenzaldehyde. Other reported syntheses such as hydrolyses of p-halomethylbenzoic acid and derivatives and oxidations of p-toluic acid are not selective enough. These reactions give products that contain 4-carboxybenzaldehyde and terephthalic acid, which cannot be reduced to levels below 1–2% by usual purification methods. Terephthalic acid can be removed from p-hydroxymethylbenzoic acid after several recrystallizations from water but 4-carboxybenzaldehyde cannot.

The extent of the problem was recognized at least as far back as 1958 when Ludwig, Ramm and Wiegand, *J. prakt. Chem.* (4) 6, 103 (1958) stated, "presently known syntheses of p-hydroxymethylbenzoic acid offer no possibilities of producing this hydroxycarboxylic acid commercially, so that production of a polyester fiber from p-hydroxymethylbenzoic acid on a large scale in the forseeable future is unlikely." This conclusion was reached upon the basis of low molecular weight polymers of p-hydroxymethylbenzoic acid with viscosities of 0.2–0.4, a glass transition temperature (Tg) of 90° C. and melting points of from 205 to 250° C. The polymers were compared to poly(ethyleneterephthalate) of viscosity 0.6–1.0 with a Tg of 73° C. and a melting point of 265° C.

Procedures also exist for the preparation of m-hydroxymethylbenzoic acid. These syntheses are analogous to those described for preparation of p-hydroxymethylbenzoic acid and methyl p-hydroxymethylbenzoate and which have been shown to be unsuitable for preparation of high-purity monomer. These methods give products, i.e., m-hydroxymethylbenzoic acid and methyl m-hydroxymethylbenzoate, contaminated with toluic acid, carboxybenzaldehyde and dicarboxylic acid impurities that are difficult to remove.

We have now found a process for the preparation of highly purified monomers for homopolymers of p-hydroxymethylbenzoic acid and m-hydroxymethylbenzoic acid. The process involves the electrochemical side-chain acetoxylation of toluic acid methyl ester compounds to form the acetates of m and p-hydroxymethylbenzoic acid. The resulting monomers are easy to purify and can be polymerized directly by a catalytic ester interchange procedure to poly(methylenebenzoates), or can be hydrolyzed to p-and m-hydroxymethylbenzoic acids.

Anodic side-chain acetoxylation of methylbenzenes has been known (C. Magnussun et al., *Chemica Scripta*, 1, 57, (1971)). Benzene derivatives containing strongly electron-withdrawing substituents such as —COOCH$_3$ are known in the prior art as not undergoing nuclear acetoxylation (Eberson, JACS, 89, 4672). Surprisingly, it has been found now that side-chain benzylic acetates can be formed with methyl toluate under the conditions of the instant invention despite the presence of a —COOCH$_3$ group.

Ester interchange reactions are well known. For purposes of this invention, the term "ester interchange" is defined as a reaction between an ester and another compound, characterized by an exchange of alkoxy groups or of acyl groups, and resulting in the formation of a different ester. In the best-known types of ester interchange, the compound with which the ester reacts can be an alcohol (trans-alcoholysis), an acid (trans-acidolysis) or an ester (transester-ester exhange). The transester-ester interchange reaction has not been used as much as the other methods. In the absence of a catalyst, the formation of polyesters by the elimination of simple esters from fully esterified starting materials has been often considered as being too slow to be of practical value (I. Goodman et al., *Polyesters,* Pergaman Press, New York, 266 (1965)). Zinc acetate has been used as a catalyst to obtain poly (p-phenyleneterephthalate) from diphenyl terephthalate and p-diacetoxybenzene, magnesium as a catalyst with dimethyl terephthalate and 1,2-diacetoxyethane to obtain poly(ethyleneterephthalate) (*Encyclopedia of Polymer Science and Technology,* Interscience, New York, 11, 95 (1969)). Ethyl stearate and cetyl acetate reacted in an ester interchange reaction with sulfuric acid as a catalyst (V. V. Korshak, *Polyesters,* Pergamon, New York, 266 (1965)). In some cases, basic catalyst such as amines and potassium hydroxide are used, U.S. Pat. No. 3,039,994; Korshak, op. cit., 267.

Accordingly, it is an object of this invention to develop a method for side-chain acetoxylating methyl toluates. It is also an object of this invention to develop a method for purifying the side-chain acetoxylated methyl toluates, which are acetoxylated m- and p-hydroxymethylbenzoic acid compounds, to a purity required for polymerization use. It is also an object of this invention to teach a method for efficient polymerization of the said acetoxylated m- and p-hydroxymethylbenzoic acid compounds to produce high molecular weight homopolymers.

SUMMARY OF THE INVENTION

Highly purified monomers of acetoxylated hydroxymethylbenzoic acid compounds for poly)p-methylenebenzoate)polymers and poly(m-methylenebenzoate)polymers are prepared by side-chain acetoxylation of toluic acid methyl ester compounds. The purification process can be by crystallization or by fractional distillation.

DETAILED DESCRIPTION OF THE INVENTION

Acetoxylated m- and p-hydroxymethylbenzoic acid compounds are prepared in a convenient manner by side-chain acetoxylating toluic acid methyl ester compounds. The acetoxylation reaction surprisingly occurs with methyl toluates despite the presence of the strongly electron-with-drawing substituent group —COOCH$_3$ under the conditions of the invented process. The process utilizes anodic acetoxylation. The products are the acetoxylated m- and p-hydroxymethylbenzoic acid compounds. Hydrolysis by a base and acidification can yield hydroxymethylbenzoic acid. The highly purified acetoxylated hydroxymethylbenzoic acid compounds are catalytically polymerized directly after purification. Linear polyester polymers of hydroxymethylbenzoic acid are suitable for production of fabricated articles.

For purposes of this invention the term "acetoxylation" is defined as substitution of an acetoxy group, i.e., CH$_3$COO—, for the hydrogen in a molecule of an organic compound having a carbon-hydrogen moiety (—CH) which can be attached to an aromatic nucleus. The —CH moiety can be a —CH$_3$ group. Any lower alkyl ester of this family of compounds can be used in the acetoxylation. The methyl ester is taught but it is to be understood that where the methyl ester is taught, other lower alkyl ester groups of 1 to 6 carbon atoms are understood and can be used. Examples are esters having ethyl, n-propyl, i-propyl, n-butyl, i-butyl, s-butyl, pentyl, n-hexyl, i-hexyl, and s-hexyl groups. The free acid can be used but it is preferable to use the methyl ester.

The methyl ester toluates are side-chain acetoxylated in the process of the invention by electrolytic anodic acetoxylation in the liquid phase in a non-nucleophilic acid media comprising a solvent of glacial acetic acid and a supporting electrolyte in an electrolysis cell at atmospheric pressure and at temperatures from −30° to 110° C. Glacial acetic acid is required to keep water content at a minimum. A preferable temperature range is from 80° to 100° C. In general, the electrolytic anodic side-chain acetoxylation is conducted in a relatively concentrated solution, within the range of 0.5 to 4.0 molar, of the substrate in a non-aqueous solution.

It is beneficial to minimize undesirable reactions at the anode by the proper selection of the electrolytic constituents. Since aromatic compounds in an electrolytic solution can be oxidized at the anode to give cation radicals or dications, these then can react with the nucleophiles present, the substrate itself, the solvent, or the anion of the supporting electrolyte to give substitution or addition products.

The electrolytic side-chain reactions of this invention were carried out by applying a suitable source of direct current to two platinum electrodes immersed in the electrically conducting solution of the organic compounds in glacial acetic acid. Other electrode materials are known in the art and can be selected from the group consisting of platinum black, gold and carbon. Acids, bases or salts as supporting electrolytes are necessarily added to the solution usually to provide electrical conductivity since most organic compounds are nonconductors. Selection of the conducting substance requires that its acetoxylation occur with more difficulty than that of the organic compound. Tetraalkylammonium tetrafluoroborates, either the tetrapropyl or tetrabutylammonium tetrafluoroborate, are well-known as useful electrolytes for anodic processes in non-aqueous solvents.

After electrolysis and vacuum-stripping of the reaction mixture, an ethyl ether extraction of the residue was used. In an ethyl ether extraction, the electrolytic anodic acetoxylation solvent is evaporated off, ethyl ether is added to extract the product away from the electrolytic salt, the ethyl ether in turn is evaporated off, and then the unreacted starting materials are vacuum-distilled from the acetoxylated product, which is the diester. The hydroxy product is obtained by hydrolyzing the diester, by dissolving it in a base, i.e., concentrated sodium hydroxide, with the application of heat. The reaction product is precipitated by addition of acid, i.e., hydrochloric acid. Repeated washings with water, followed by chloroform washes and air drying yields the purified hydroxymethylbenzoic acid as product. In a continuous process, good yields of the acetoxylated product are possible if the product is removed rapidly. Solvent extraction can be used. The solvent can be an aliphatic hydrocarbon of a lower boiling point than the product. A typical solvent is heptane.

In most electrolytic preparations, a divided cell is used. The anode is separated from the cathode by means of a diaphragm, often porous alumina, in order to prevent the oxidized product from being reduced and vice versa. In this instance, a polyethylene screen was used to insulate electrically the cathode from the anode and not as a diaphragm. Anode current efficiencies are not high. The actual number of ampere hours used is substantially greater than the theoretical amount of current necessary (53.6 ampere hours per mole of product, assuming two electrons per molecule of product), and often can be two times greater than theoretical. Preferable current efficiencies are, of course, closest to theoretical.

In summary, the electrolytic anodic side-chain acetoxylation process of the invention accordingly provides a new method to prepare acetoxylated m-and p-hydroxymethylbenzoic acid compounds and the corresponding carboxylic acids. The process operated by side-chain acetoxylating toluic methyl ester acid compounds in a glacial acetic acid solution in an electrolysis cell. The electrolytic reactions of this invention are carried out by applying a suitable source of direct current to two electrodes immersed in the electrically conducting solution of the organic compounds. Preferably the electrodes are of platinum but other electrode materials can be used, namely, platinum black, gold and carbon. The side-chain acetoxylation occurs in the liquid phase in non-nucleophilic media at atmospheric pressure and at temperatures from $-30°$ to $110°$ C. The media is a solvent solution of a supporting electrolyte and glacial acetic acid as the solvent. The concentration of the substrate, i.e., the toluic acid compound to be side-chain acetoxylated, is within the range of 0.5 to 4.0 molar, with respect to the solvent. A convenient range is 1.5 to 2.5 molar. Direct current applied was within a current density range of 0.008 to 0.016 amperes/sq. centimeter. An economic commercial application would necessarily require a higher current density and should be as high as possible. Range of current applied can be from 0.03 to 1.0 amperes/sq. centimeter. An expected operating range is from 0.1 to 0.2 amperes/sq. centimeter.

Purification of the side-chain acetoxylated products can be by either fractional distillation of either the meta or para isomer at reduced pressure (under 100 mm Hg) and/or recrystallation of the para isomer from a suitable solvent system.

The melting point of acetoxylated methyl p-hydroxymethylbenzoate is $30°-31°$ C. The boiing point is $102°-104°$ C./0.1 mm Hg; $117°-119°$ C./0.6 mm Hg.

In general, any aliphatic hydrocarbon solvent which will solubilize the side-chain acetoxylated products can be used. The recommended aliphatic hydrocarbon solvent systems and concentrations for recrystallization of acetoxylated methyl p-hydroxymethylbenzoate are:
  (a) 4-50 g of acetoxylated methyl p-hydroxymethylbenzoate in 100 ml hexane heated to $20°-50°$ C. and then cooled to $-77°$ to $10°$ C.
  (b) 20-60 g of acetoxylated methyl p-hydroxymethylbenzoate in 100 ml diethyl ether/hexane in a 1:1 ratio heated to $20°-50°$ C. and then cooled to $-77°$ to $10°$ C.
  (c) other light hydrocarbon fractions such as petroleum ether, etc. can be used with equivalent quantities and at equivalent temperatures.

In contrast to these methods of purifying side-chain acetoxylated methyl p-hydroxymethylbenzoate, the purification by distillation of methyl p-hydroxymethylbenzoate is very difficult as decomposition apparently occurs to give the 4-carbomethoxybenzaldehyde, with the result that in fractional distillation of the methyl p-hydroxymethylbenzoate, each fractional cut is less pure than the starting material. Crude methyl p-hydroxymethylbenzoate can be purified to some extent in 90-95% recovered yields by fractional distillation or recrystallation: B.P. $125°-127°/0.4$ torr; M.P. $49°-50°$. Methyl m-hydroxymethylbenzoate is a colorless mobile liquid that does not crystallize, even at $-77°$ C.

In general, catalysts are employed in polyester syntheses to promote the progress of the reaction, to run the reaction at lower temperatures and pressures than otherwise possible and to control the attributes of the final polyester such as color, degree of polymerization including chain length and viscosity, and other characteristics attributable to chemical structure. Accordingly, the type of catalyst used in a polyesterification reaction will depend upon the type of ester exchange reaction, i.e., alcoholysis, acidolysis or ester-ester exchange.

In spite of many possible synthesis methods, polyesters are most often synthesized by exchange reactions of trans-alcoholysis between pairs of reactants comprising diols plus dicarboxylic acid diesters, of trans-acidolysis between diol-diesters plus dicarboxylic acids, and of transester-ester exchange between diol-esters plus dicarboxylic acid esters. The trans-alcoholysis exchange occurs with the formation of an alcohol or water which is driven off to complete the reaction. The trans-acidolysis exchange is driven to completion by the formation of an acid, often acetic acid, and its removal. The transester-ester exchange reaction is driven to completion by the formation of an ester which is in turn eliminated from the reaction. The mechanism of the trans-acidolysis reaction proceeds by first-order kinetics even in the melt stage while trans-alcoholysis is well-known to proceed by second-order kinetics, or at best by pseudo first-order kinetics when a large excess of one reactant is used. A study of the mechanism of trans-acidolysis by Loncrini, *J. of Polymer Science*, 4, 1531-1544 (1966), indicates the reaction through a 4-center rearrangment step. Trans-alcoholysis is a simple substitution reaction and involves no such step. Transester-ester exchange when uncatalyzed has been postulated as proceeding by second-order kinetics. But, as has also been pointed out, a second-order reversible reaction which can be demonstrated in a transester-ester exchange reaction, also can be fitted by third order irreversible reaction kinetics (R. E. Wilfong, *J. Polymer Sci.*, 54, 387 (1960). It is well-known the presence of a catalyst can affect the reaction kinetics of polyester formation, in some cases changing a second order reaction to a first order reaction. The effect of catalysts upon the reaction kinetics in the formation of polyesters accordingly can be significant and selection of suitable catalysts for an ester exchange reaction will depend upon whether the reaction is one of trans-alcoholysis, trans-acidolysis or transester-ester exchange.

Many substances act as catalysts for the trans-alcoholysis polycondensation reaction of glycols and bisphenols with dicarboxylic acid esters. They are generally weak bases typified by the carbonates, alkanoates, hydrides or alkoxides of sodium, lithium, zinc, calcium, magnesium, aluminum and titanium, organomagnesium halides and complex alkoxides such as $NaHTi(OBu)_6$, $MgTi(OBu)_6$ and $CaTi(OBu)_6$ and are used in amounts of 0.05 to 0.5% by weight of the total reactants. A proposed mechanism for the trans-alcoholysis reaction is that the catalyst initially reacts with the diol to produce an ionized glycoloxide which then attacks nucleophilically the carbonyl group of the ester. The metal alkoxide is eliminated and regenerates the glycoloxide.

Polyesterification by the trans-acidolysis route of a diester of a dihydric phenol or bisphenol with a dicarboxylic acid often uses a catalyst such as p-toluenesulfonic acid, antimony oxide, magnesium metal, titanium butoxide, zinc or sodium acetate either in the melt stage or in a high-boiling inert liquid. It has been postulated that the mechanism of the trans-acidolysis reaction proceeds through an initial hydrogen bonding of the ester with a carboxylic acid group which increases the electrophilic character of the ester carbonyl group. This favors attack by the carboxylate anion, producing a four-membered transition state intermediate in which exchange occurs with formation of an acid and an ester bond.

Transester-ester exchange reactions have been catalyzed with magnesium, zinc acetate and tertiary amines such as tri-n butylamine, N,N-diethylaniline, N,N-dimethylaniline, N,N-dimethylnaphthylamine and N,N-dipropylaniline. The transester-ester exchange reaction has been thought to be a second order reversible reaction wherein the reactivity of the monomer toward polyesterification is substantially less than that of higher oligomers with the reduced reactivity being explained in terms of a reduced activation entropy.

The three types of ester exchange are accordingly exceedingly different in mechanisms and catalyst requirements.

In general, the polymerization reaction is carried out with a monomer catalyst mixture wherein the ratio of catalyst to monomer is 1.0 to 0.001% by weight. Typical catalysts which can be used are tetrabutyl titanate, tetraisopropyl titanate, dibutyl tin maleate, tin butyl stanoic anhydride and dihydroxy tin chloride. A preferred catalyst is dibutyl tin maleate because of activity.

The pressure at which the process is operated is not critical and it has been found convenient to conduct at least part of the process at atmospheric. However, since the reaction results in the production of a volatile condensation product, methyl acetate, it has been found advantageous to complete the reaction under reduced pressure to assist the removal of such volatile materials.

The reaction is preferably effected in the absence of air which can cause some degradation and undesirable coloring of the products, and, if desired, can be effected under a constant flow of an inert gas, that is, a gas which does not interfere with polymerization reaction, for example, nitrogen which can conveniently be passed through the reaction mixture to stir the mixture and aid the removal of the volatile reaction products.

The reaction is conveniently effected in two stages, the first stage being to drive off any initial volatile condensation products and to obtain a homogeneous melt, and the second stage, at a higher temperature than the first stage, to continue the polymerization to a desired degree of conversion.

Reactions are run at a temperature of from 100° to 300° C. under an inert gas as a sweep for a period of from 0.5 to 10 hours. Preferred conditions are 150° to 200° C. for 120 minutes under a nitrogen sweep gas. Partial vacuum of 600 to 100 mm Hg is then applied for a period of 0.5 to 10 hours, preferred 0.5 to 4 hours, and full vacuum, 5.0 to 0.01 mm Hg, applied for 1 to 8 hours with the temperature maintained at 250 to 310° C. The product, which is a melt, is removed from the reactor, cooled to a solid state under 100° C. and finely ground to about 20 to 40 mesh. The material can then be solid state polymerized by heating at 150° to 250° C. at 50–0.1 mm Hg vacuum for 6 to 24 hours. Preferred conditions are 220°–240° C. at 0.5 mm Hg for 8–16 hours. Inherent viscosity (I.V.) was measured in deciliters/gram (dl/g) in a 60/40 phenol tetrachloroethane solvent at 30° C.

In order to facilitate a clear understanding of the invention, i.e., the process for preparing monomers of hydroxymethylbenzoic acid by electrolytic anodic sidechain acetoxylation of toluic acid compounds, the purification procedures and the catalytic polymerization of the resulting compounds, the following specific embodiments are described in detail. It should be understood, however, that the detailed expositions of the process, while indicating preferred embodiments, are given by way of illustration only since various changes and modifications within the spirit and scope of the invention will become apparent to those skilled in the art from this detailed description.

EXAMPLE I

The side-chain acetoxylation of methyl p-toluate was conducted in a glass beaker type cell, containing two concentric platinum screen cylinders (approx. 63 $cm^2$) insulated from each other by a plastic screen and with leads attached for power supply connections. The beaker was provided with magnetic stirring and a cover. The electrolyte consisted of 12.0 grams of methyl p-toluate and 1.2 grams of tetrabutylammonium tetrafluoroborate in glacial acetic acid as a solvent to make 80 ml total volume. Current (0.3 to 1.2 amps) was then passed through this solution for 9 hrs. Initially the temperature was 50° C. but was increased to the preferred temperature of 90° C. within a short period of time. After electrolysis the reaction mixture was transferred to a 300 ml round bottomed flask and vacuum stripped to a temperature of 45° C. at 2–3 Torr to remove acetic acid. This residue was then extracted with a water-immiscible solvent, 100 ml of ethyl ether, to remove products from the salts. The ethyl ether was removed by evaporation under nitrogen and the residue vacuum fractionated using an Ace Mini Lab distilling apparatus. 6.2 grams (approx. 51%) of unreacted methyl p-toluate was recovered and 2.5 grams of acetoxylated methyl p-hydroxymethylbenzoate was obtained at 117°–119° C./0.6 mm Hg. Its structure was determined by comparing its gas chromatographic retention time and NMR spectrum with an authentic sample. The yield was 43% based on a 48% conversion of methyl p-toluate. The electrical current efficiency was 16%.

EXAMPLE II

The side-chain acetoxylation of methyl m-toluate was run with the same equipment and procedures, except 12.0 grams of methyl m-toluate were used instead of the p-toluate. The current was 1.0 to 1.5 amps for 6.5 hrs. at 75° to 95° C. 4.2 grams (35%) of unreacted methyl m-toluate were recovered. 5.4 grams of the product, acetoxylated methyl m-hydroxymethylbenzoate, came over at 141°–144° C./3.8 mm Hg., and 106° C./0.4 mm Hg. Its structure was determined by comparing its gas chromatographic retention time and NMR spectrum with an authentic sample. The yield was 70% and current efficiency 18%.

EXAMPLE III

To illustrate the formation of polyester from the products synthesized by the above process, a mixture of 4.0 grams of side-chain acetoxylated methyl p-hydroxymethylbenzoate and 0.1 milliliters of tetrabutyl titanate as catalyst was heated in a test tube equipped with a nitrogen gas bubbler and vacuum side-arm. The mixture was heated with a slow nitrogen sweep and at 157° C. a volatile product, methyl acetate, was first observed. The temperature as slowly raised to 220° C. over 2 hours. A viscosity increase was observed during this period and also a brown color developed. A partial vacuum was applied. Only a trace of sublimate was observed indicating that approximately all of the monomeric acetoxylated methyl p-hydroxymethylbenzoate had reacted. Polymerization was continued at 260° C. and full vacuum (0.45 mm Hg) for 2 additional hours to insure completion of the reaction to give a brown-red, brittle polyester with a 0.16 dl/g inherent viscosity (IV). The low inherent viscosity indicated the need for further purification of the monomer and/or the use of a more active transester-ester exchange catalyst.

EXAMPLE IV

The following illustrates the difficulty of purifying the non-acetoxylated material, methyl p-hydroxymethylbenzoate. Distillation resulted in fractional cuts which were less pure than the starting material.

Crude, impure methyl p-hydroxymethylbenzoate 500 g was fractionally distilled through a 14″ Vigreux column at 115°–116° C. at 0.3 mm Hg vacuum. A fore-cut was collected (cut 1), a heart-cut isolated (cut 2), and the pot residue was analyzed (cut 3). In Table 1, the analysis and purity of the starting material is compared to the analyses and purities of the cuts.

Table 1

|  | Starting Material | Cut 1 | Cut 2 | Cut 3 |
|---|---|---|---|---|
| Weight Recovered, g | — | 20.00 | 442.5 | 20.2 |
| % Methyl p-hydroxymethylbenzoate (Purity by Difference) | 99.5 | 90.56 | 99.37 | 94.85 |
| Impurities, %, Total | 0.45 | 9.44 | 0.634 | 5.15 |
| A | 0.14 | — | — | — |
| B | <0.0050 | 7.92 | 0.15 | — |
| C$^a$ | — | 0.049 | — | — |
| D | — | 0.56 | 0.042 | 0.024 |
| E | 0.012 | 0.26 | 0.098 | 1.77 |
| F | 0.18 | 0.15 | 0.16 | — |
| G | — | 0.041 | 0.054 | 0.045 |
| Others* | 0.103 | 0.459 | 0.13 | 3.251 |

A-Toluic acid
B-Carbomethoxybenzaldehyde
C$^a$-Before dimethyl terephthalate
D-Dimethyl terephthalate
E-p-Xylendiol
F-Monomethyl terephthalate
G-Methyl p-hydroxymethylbenzoate
*Structure unknown Not only was the impurity level of Cut 2 greater than the starting material, but the level of mono-functional impurities in Cut 2 which would limit polymer molecular weight was greater than in the starting material.

EXAMPLE V

The following example illustrates that the acetoxylated product, side-chain acetoxylated methyl p-hydroxymethylbenzoate, can be purified by distillation.

A mixture of 940 g of crude, impure methyl p-hydroxymethylbenzoate of the same analysis as the "starting material" in Example IV and 808.2 g of acetic anhydride were refluxed for 4.0 hours. The acetic acid formed and excess acetic anhydride were removed by distillation at 150 mm Hg. The water-white product, acetoxylated methyl p-hydroxymethylbenzoate, was distilled at 102°–104° C./0.10 mm Hg, and the product weight was 1089.8 g (93% yield). Analysis of the product showed no organic impurities other than a small amount of unreacted methyl p-hydroxymethylbenzoate.

EXAMPLE VI

The following example illustrates the formation of polyester from acetoxylated methyl p-hydroxymethylbenzoate and preferred catalyst dibutyl tin maleate versus tetrabutyl titanate as was used in Example III.

106.7 g of acetoxylated methyl p-hydroxymethylbenzoate from Example V and 0.3 g of dibutyl tin maleate were placed in a polycondensation reactor and heated at 320°–482° F. for 96 minutes with stirring and with a nitrogen sweep. Partial vacuum was applied over a 50 minute period and full vacuum (0.37–0.48 mm Hg) was continued for an additional 240 minutes while the temperature was maintained at 482° F. The product had a 0.45 dl/g inherent vicosity.

The product was finely ground and solid state polymerized at 235° C. at 0.3 mm Hg for 24 hours. The product had a 0.58 dl/g inherent viscosity, a glass transition temperature (Tg) of 94° C., and a crystalline melting point (Tm) of 258° C.

What is claimed is:

1. A process for preparing linear polyesters of hydroxymethylbenzoic acid from acetoxylated hydroxymethylbenzoic acid compounds which comprises (1) the electrolytic anodic side-chain acetoxylation of a solution comprising a toluic acid methyl ester compound, a non-nucleophilic media of glacial acetic acid and a supporting electrolyte consisting essentially of tetraalkylammonium tetrafluoroborate by applying a source of direct current to said solution at temperatures of from about −30° to 110° C., (2) isolating an acetoxylated hydroxymethylbenzoic acid compound, and (3) polymerizing the said acetoxylated hydroxymethylbenzoic acid compound by transester-ester exchange.

2. The process of claim 1 wherein the said toluic acid methyl ester compound is methyl p-toluate.

3. The process of claim 1 wherein the said toluic acid methyl ester compound is methyl m-toluate.

4. The process of claim 1 wherein the concentration of said toluic acid methyl ester compound to said glacial acetic acid is within the range of 0.5:1 to 4.0:1, toluic acid methyl ester compound to glacial acetic acid.

5. The process of claim 1 wherein an acetoxylated hydroxymethylbenzoic acid compound is isolated by fractional distillation at reduced pressure under 100 mm Hg.

6. The process of claim 1 wherein the acetoxylated p-hydroxymethylbenzoic acid compound is isolated by:
    (a) Addition of an aliphatic hydrocarbon solvent.
    (b) Heating the solution to 20° to 50° C.
    (c) Cooling the solution to −77° to 10° C.
    (d) Removal of the solvent.

7. The process of claim 6 wherein the said aliphatic hydrocarbon solvent is selected from the group consisting of hexane, diethyl ether, petroleum ether and mixtures thereof.

8. The process of claim 1 wherein the said polymerization step comprises the steps of (1) heating the said acetoxylated hydroxymethylbenzoic acid compound in the presence of a catalyst in a concentration of 1.0 to 0.001% by weight of said acetoxylated hydroxymethylbenzoic acid compound to a temperature within the range from about 100° to 300° C. under an inert gas as a sweep for a period of from 0.5 to 10 hours, (2) applying a partial vacuum of 600 to 100 mm Hg for a period of 0.5 to 10 hours, (3) increasing the vacuum to 5.0 to 0.01 mm Hg for a period of from 1 to 8 hours at an increased temperature within the range from about 250° to 310° C., (4) cooling the product to a temperature under 100° C., and grinding the said product to about 20 to 40 mesh and (5) solid state polymerizing the said product by heating at a temperature within the range of 150° to 250° C. at 50 to 0.1 mm Hg for a period of from 6 to 24 hours.

9. The process of claim 8 wherein the said inert gas is selected from the group consisting of nitrogen, carbon dioxide and argon.

10. The process of claim 8 wherein the said catalyst is dibutyl tin maleate.

11. The process of claim 1 wherein the said tetraalkylammonium tetrafluoroborate is at least one member selected from the group consisting of tetrapropylammonium tetrafluoroborate and tetrabutylammonium tetrafluoroborate.

* * * * *

UNITED STATES PATENT OFFICE
CERTIFICATE OF CORRECTION

Patent No. 4,182,847    Dated January 8, 1980

Inventor(s) Ellis K. Fields, Steven A. Cerefice and Edward E. Paschke

It is certified that error appears in the above-identified patent and that said Letters Patent are hereby corrected as shown below:

| Column | Line | |
|---|---|---|
| 1 | 52 | *"p-halolotoluene" should be --p-halotoluene-- |
| 3 | 33 | "poly )p-" should be --poly (p--- |
| 3 | 47 | "electron-with-drawing" should be --electron-withdrawing-- |
| 6 | 37 | "reaction through" should be --reaction proceeds through-- |
| 9 | 4 | "as slowly" should be --was slowly-- |
| 9 | 37 | "99.5" (Table 1, under "Starting Material") should be --99.55-- |

UNITED STATES PATENT OFFICE

CERTIFICATE OF CORRECTION

Patent No. 4,182,847      Dated January 8, 1980

Inventor(s) Ellis K. Fields, Steven A. Cerefice and Edward E. Paschke

It is certified that error appears in the above-identified patent and that said Letters Patent are hereby corrected as shown below:

| Column | Line | |
|---|---|---|
| 9 | 46 | "B-Carbomethoxybenzaldehyde" should be --B-4-Carbomethoxybenzaldehyde-- |
| 9 | 48 | *"E-p-Xylendiol" should be --E-p-Xylenediol-- |

Signed and Sealed this

Twenty-ninth Day of July 1980

[SEAL]

Attest:

SIDNEY A. DIAMOND

Attesting Officer      Commissioner of Patents and Trademarks